(12) United States Patent
Huang

(10) Patent No.: US 7,861,992 B2
(45) Date of Patent: Jan. 4, 2011

(54) WALL-MOUNT SUPPORT

(76) Inventor: Ming-Hsien Huang, 27F.-3, No. 26, Lane 28, Lung-An Rd., Hsi-Chih City, Taipei Hsien (TW)

( * ) Notice: Subject to any disclaimer, the term of this patent is extended or adjusted under 35 U.S.C. 154(b) by 429 days.

(21) Appl. No.: 12/049,547

(22) Filed: Mar. 17, 2008

(65) Prior Publication Data

US 2009/0020658 A1   Jan. 22, 2009

(30) Foreign Application Priority Data

Jul. 18, 2007   (TW) .............................. 96211696 U

(51) Int. Cl.
*E04G 3/00* (2006.01)
(52) U.S. Cl. .............................. 248/282.1; 248/297.21; 248/285.1; 248/917
(58) Field of Classification Search ............ 248/295.11, 248/475.1, 476, 479, 480, 207, 282.1, 297.21, 248/316.8, 285.1, 498, 917
See application file for complete search history.

(56) References Cited

U.S. PATENT DOCUMENTS

| | | | | |
|---|---|---|---|---|
| 4,516,751 A | * | 5/1985 | Westbrook | ............... 248/279.1 |
| 4,878,640 A | * | 11/1989 | Fricker et al. | ............ 248/297.21 |
| 5,007,608 A | * | 4/1991 | Carroll, Jr. | ............. 248/297.21 |
| 5,904,328 A | * | 5/1999 | Leveridge et al. | ........ 248/124.1 |
| 6,554,238 B1 | * | 4/2003 | Hibberd | ................... 248/278.1 |
| 6,557,813 B1 | * | 5/2003 | Duggan | ...................... 248/476 |
| 6,783,105 B2 | * | 8/2004 | Oddsen, Jr. | .............. 248/279.1 |
| 7,063,296 B2 | * | 6/2006 | Williams | ................. 248/285.1 |
| 7,178,774 B2 | * | 2/2007 | Kim | ........................ 248/279.1 |
| 7,331,551 B2 | * | 2/2008 | Oddsen, Jr. | .............. 248/279.1 |
| 7,395,996 B2 | * | 7/2008 | Dittmer | .................... 248/291.1 |
| D603,386 S | * | 11/2009 | Le | ............................ D14/239 |
| 2009/0194655 A1 | * | 8/2009 | Huang | ...................... 248/282.1 |

* cited by examiner

*Primary Examiner*—Anita M King
(74) *Attorney, Agent, or Firm*—Frommer Lawrence & Haug LLP; Ronald R. Santucci

(57) ABSTRACT

A wall-mount support includes: a wall bracket adapted to be mounted on a wall and having a vertical track; a carrier mounted slidably on the vertical track; a pair of supporting arms, each of which extends from the carrier in a transverse direction relative to the vertical track and each of which is pivoted to the carrier so as to permit angle adjustment therebetween; and a brake mechanism including a friction-providing member connected to the carrier and operable to abut against the vertical track so as to prevent sliding movement of the carrier on the vertical track.

7 Claims, 11 Drawing Sheets

WALL-MOUNT SUPPORT

CROSS-REFERENCE TO RELATED APPLICATION

This application claims priority of Taiwanese application no. 096211696, filed on Jul. 18, 2007, the disclosure of which is incorporated herein by reference.

BACKGROUND OF THE INVENTION

1. Field of the Invention

This invention relates to a wall-mount support, more particularly to a wall-mount support including a carrier, which is slidable on a vertical track, and supporting arms pivoted to the carrier and adjustable in an angle therebetween.

2. Description of the Related Art

FIG. 1 illustrates a conventional wall-mount support that includes a wall bracket 21 having a vertical track 211, an arcuate carrier 222 mounted slidably on the vertical track 211, and an arcuate supporting arm 224 extending through and fixed to the arcuate carrier 222 and adapted to support an electronic device 12 thereon. A pair of supporting sleeves 223 are sleeved movably on two opposite ends of the supporting arm 224 so that the overall length of the supporting arm 224 and the supporting sleeves 223 can be adjusted, thereby permitting support of different sizes of the electronic device 12. However, since the supporting arm 224 is arcuate in shape and is fixed to the arcuate carrier 222, the breadth for supporting different sizes of the electronic device 12 is limited.

SUMMARY OF THE INVENTION

Therefore, the object of the present invention is to provide a wall-mount support that can overcome the aforesaid drawback associated with the prior art.

According to this invention, a wall-mount support comprises: a wall bracket adapted to be mounted on a wall and having a vertical track; a carrier mounted slidably on the vertical track; a pair of supporting arms, each of which extends from the carrier in a transverse direction relative to the vertical track and each of which is pivoted to the carrier so as to permit angle adjustment therebetween; and a brake mechanism including a friction-providing member connected to the carrier and operable to abut against the vertical track so as to prevent sliding movement of the carrier on the vertical track.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
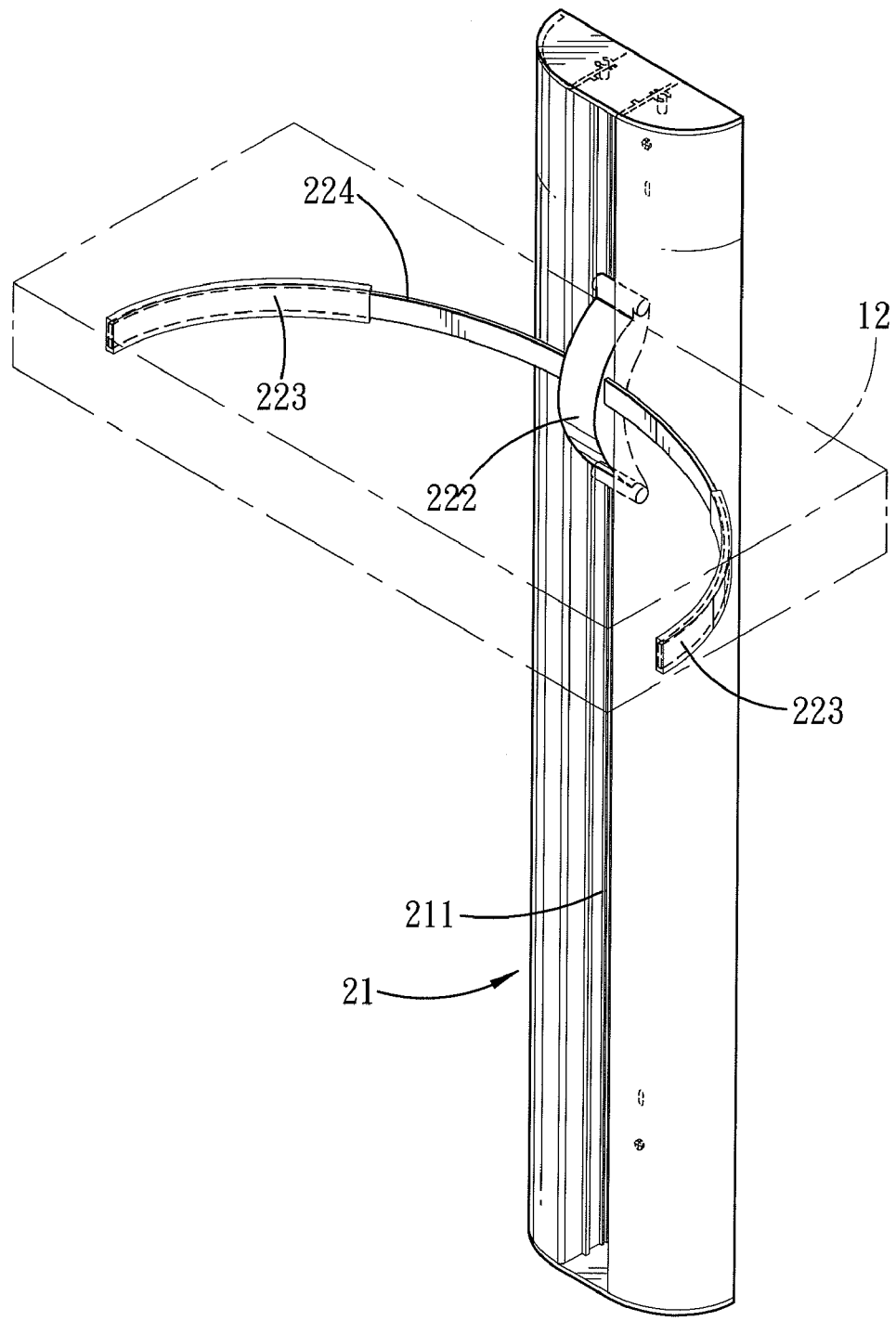
FIG. 1 is a perspective view of a conventional wall-mount support.
Figure 2:
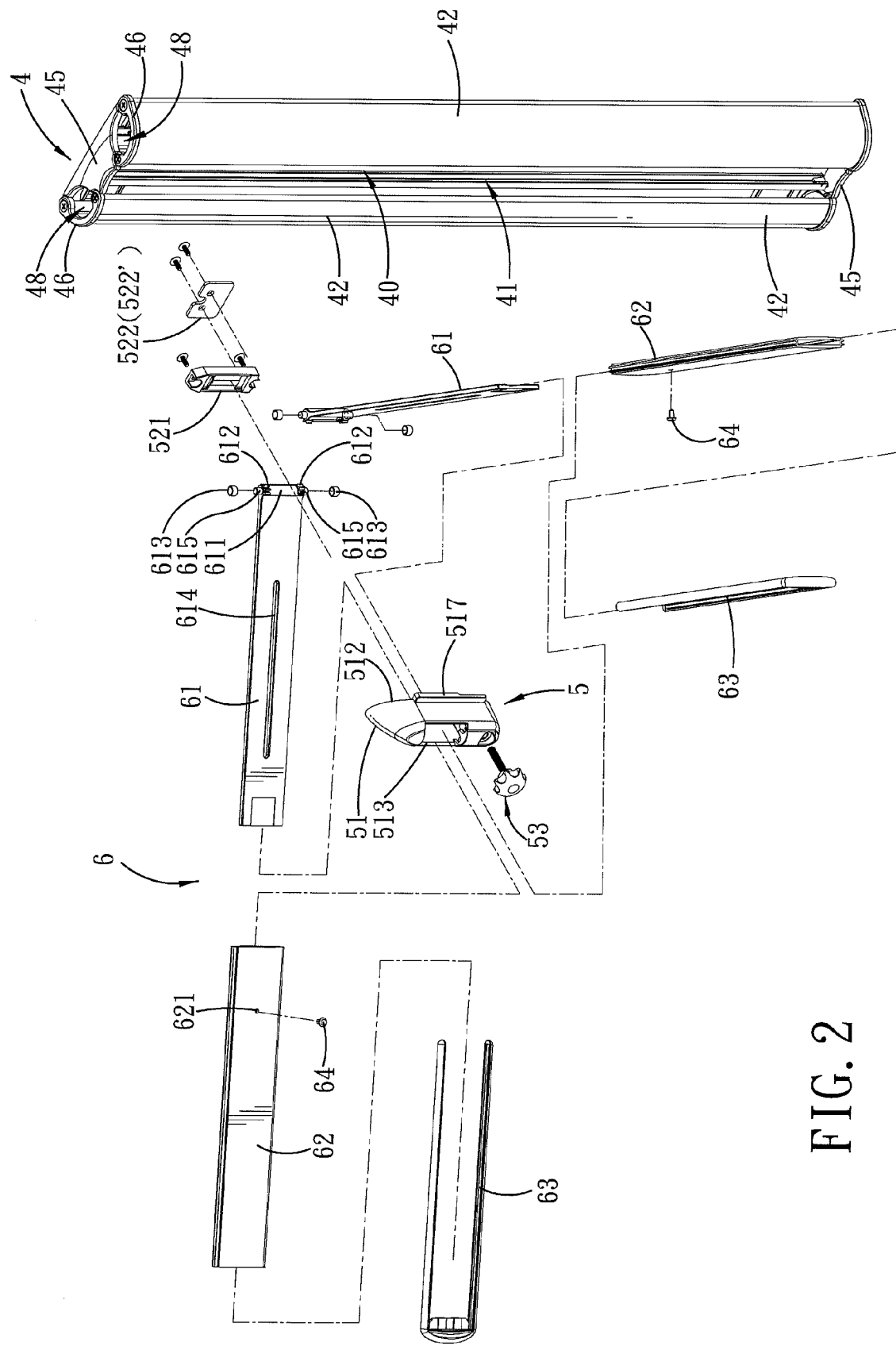
FIG. 2 is an exploded perspective view of the preferred embodiment of a wall-mount support according to this invention.
Figure 3:
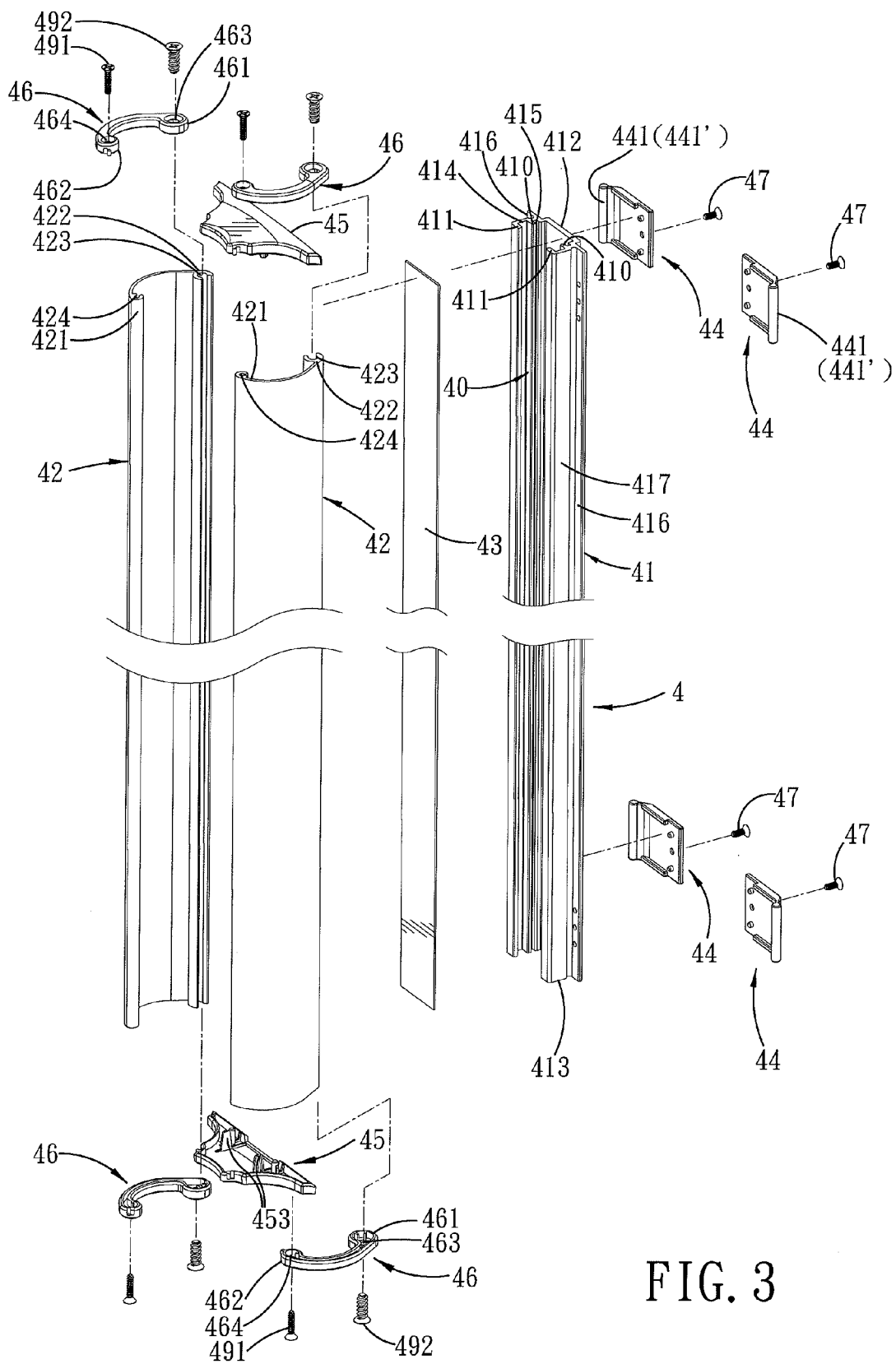
FIG. 3 is a fragmentary exploded perspective view of a wall bracket and a pair of cover plates of the preferred embodiment.
Figure 10:
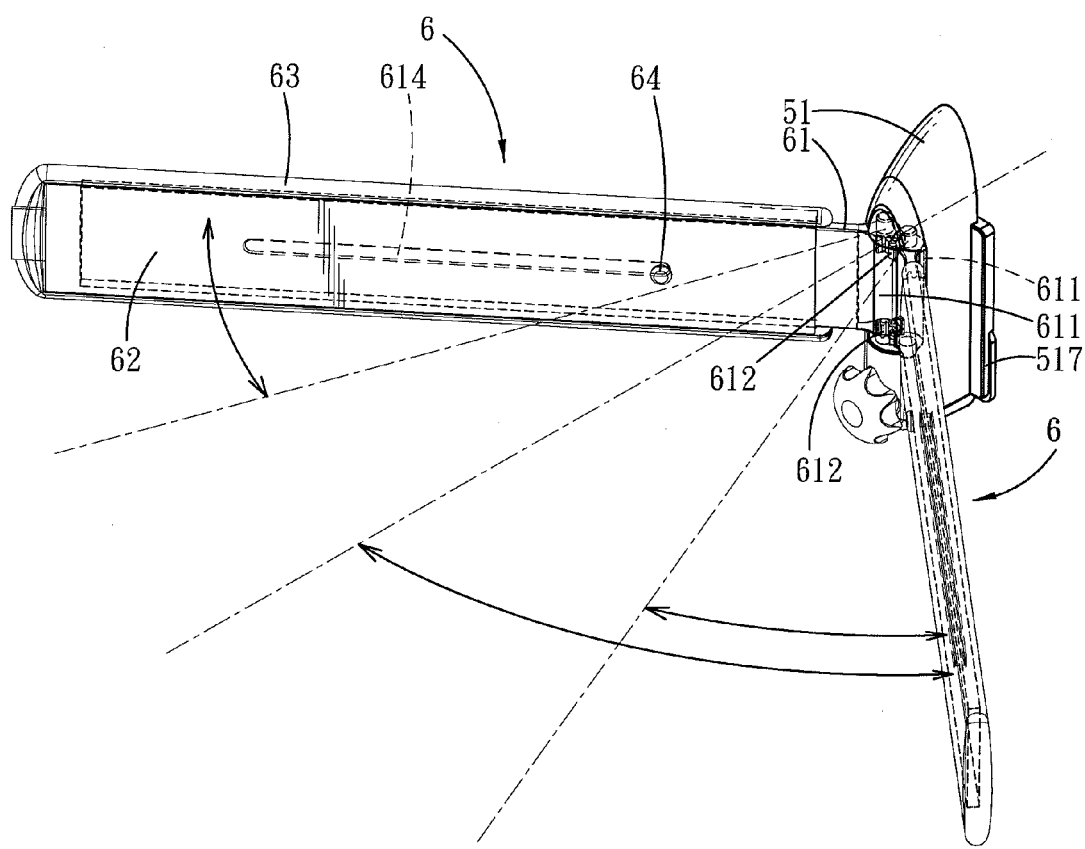
FIG. 10 is a perspective view to illustrate how the supporting arms of the preferred embodiment can be adjusted in an angle therebetween.
Figure 11:
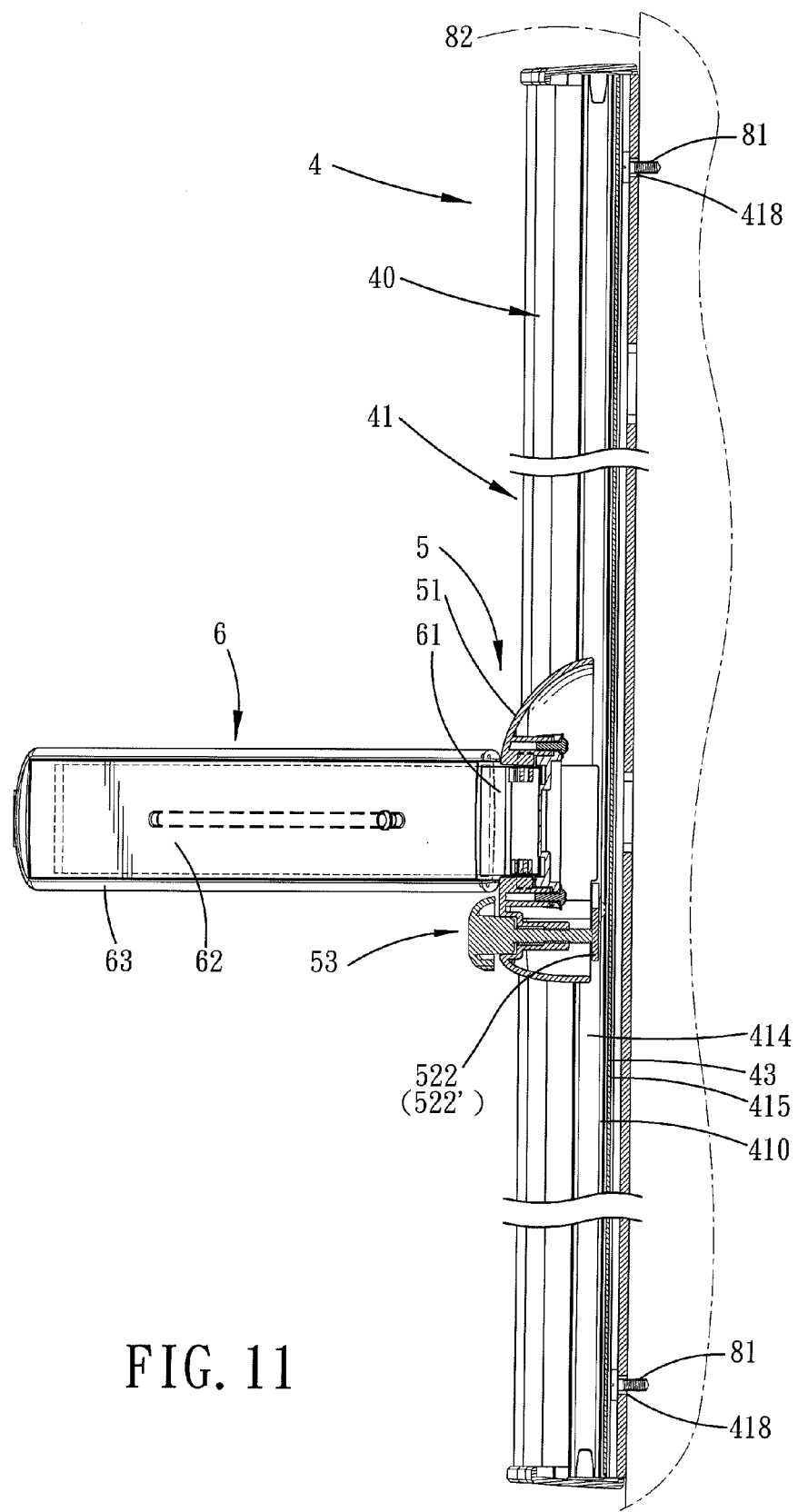
FIGS. 11 and 12 are partly sectional views to illustrate how the carrier is prevented from sliding on a vertical track using a brake mechanism of the preferred embodiment.

Referring to FIGS. 2, 3 and 11, the preferred embodiment of a wall-mount support according to the present invention is shown to include: a wall bracket 4 adapted to be mounted on a wall 82 and having a vertical track 40; a carrier 5 mounted slidably on the vertical track 40; a supporting unit connected to the carrier 5 for supporting an electronic device (not shown) thereon and including a pair of supporting arms 6, each of which extends from the carrier 5 in a transverse direction relative to the vertical track 40 and each of which is pivoted to the carrier 5 so as to permit angle adjustment therebetween (see FIG. 10); and a brake mechanism including a friction-providing member 522 connected to the carrier 5 and operable to abut against the vertical track 40 (see FIGS. 11 and 12) so as to prevent sliding movement of the carrier 5 on the vertical track 40.

In this embodiment, each of the supporting arms 6 has a toothed pivot end 612 that is pivoted to the carrier 5. The toothed pivot ends 612 of the supporting arms 6 mesh with each other so as to permit co-rotation of the supporting arms 6.

Figure 7:
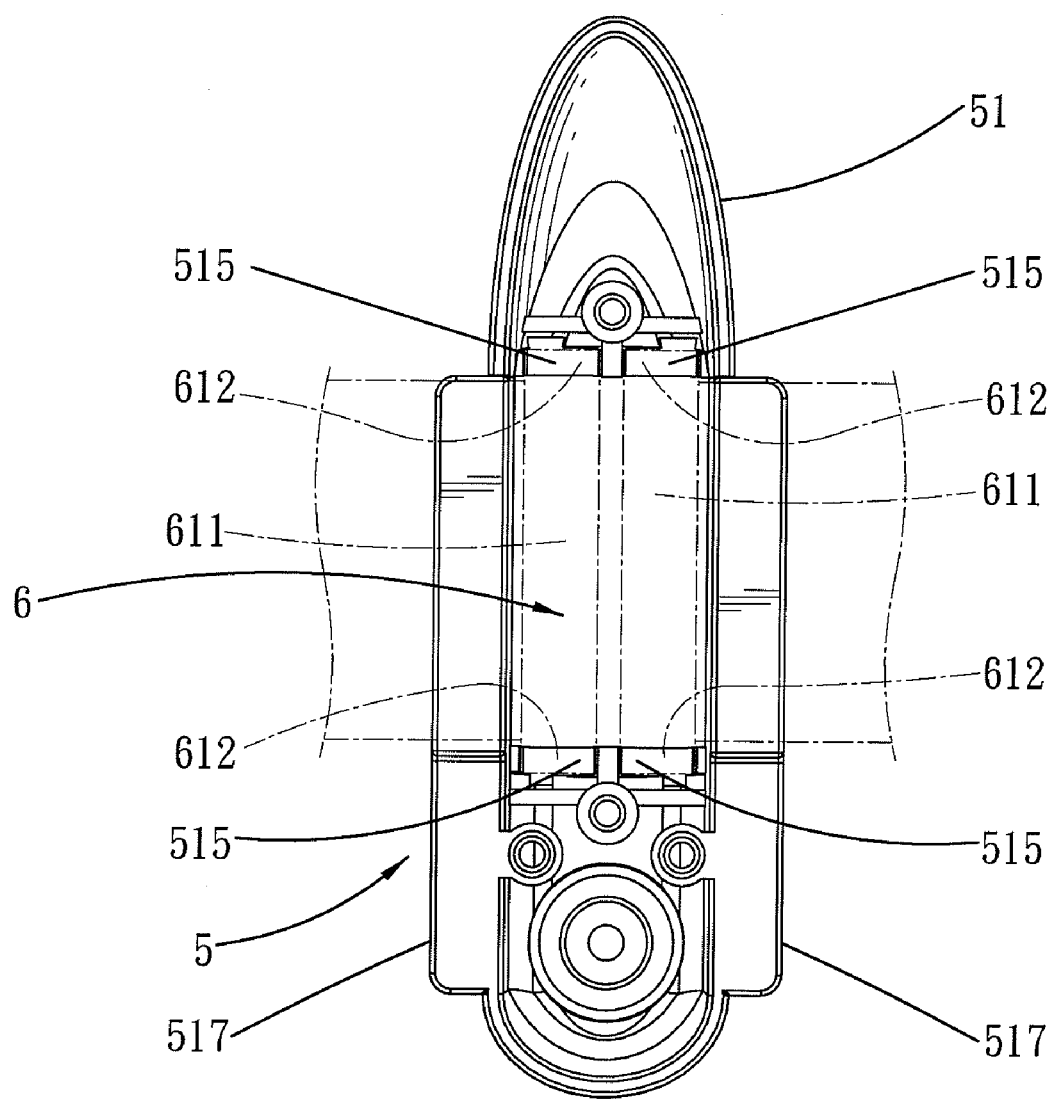
FIG. 7 is a fragmentary schematic front view of a carrier of the preferred embodiment.

The carrier 5 includes a carrier housing 51 that has front and rear open ends 513, 512 and two pairs of inner recesses 515 (see FIGS. 7 and 8) disposed between the front and rear open ends 513, 512. The toothed pivot end 612 of each of the supporting arms 6 is formed with two opposite studs 615 sleeved with rings 613 and extending into an adjacent pair of the inner recesses 515, respectively.

A confining member 521 is secured to and is disposed in the carrier housing 51 adjacent to and behind the toothed pivot ends 612 of the supporting arms 6 so as to prevent undesired removal of the toothed pivot ends 612 of the supporting arms 6 from the inner recesses 515.

Each of the supporting arms 6 includes a supporting plate 61 having opposite first and second ends. The first end of the supporting plate 61 is formed with a pivot shaft 611 that defines the toothed pivot end 612 of a respective one of the supporting arms 6. Each of the supporting arms 6 further includes a supporting sleeve 62 sleeved on the supporting plate 61 and movable relative to the supporting plate 61 in the transverse direction so as to permit length adjustment for each of the supporting arms 6, and a U-shaped protective sleeve 63 that is sleeved on a periphery of the supporting sleeve 62.

Figure 9:
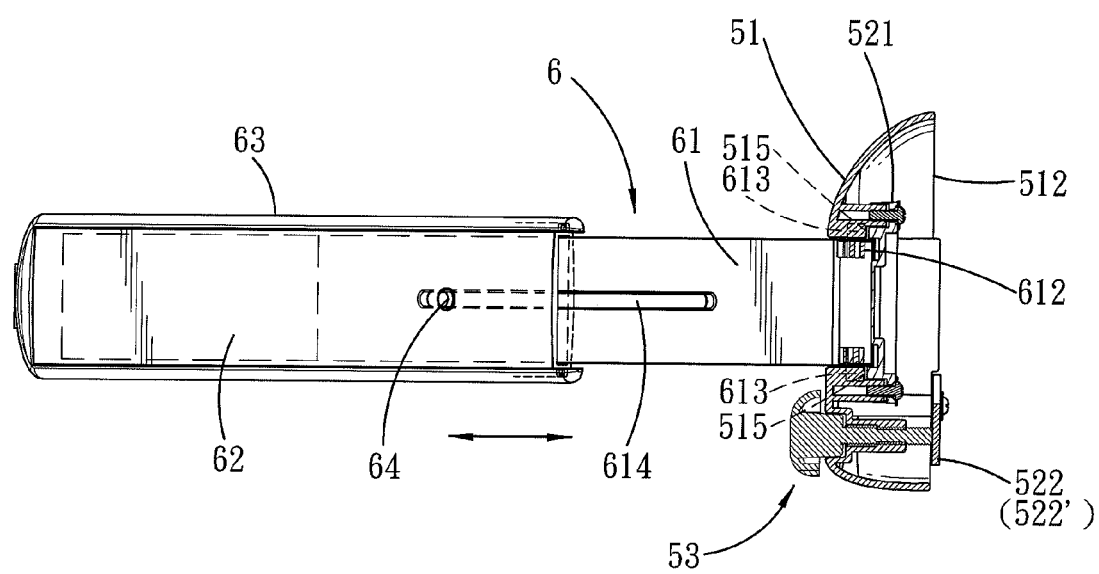
FIG. 9 is a partly sectional view to illustrate a state where a supporting sleeve is disposed at an extended position relative to a supporting plate of one of two supporting arms of the preferred embodiment.
Figure 12:
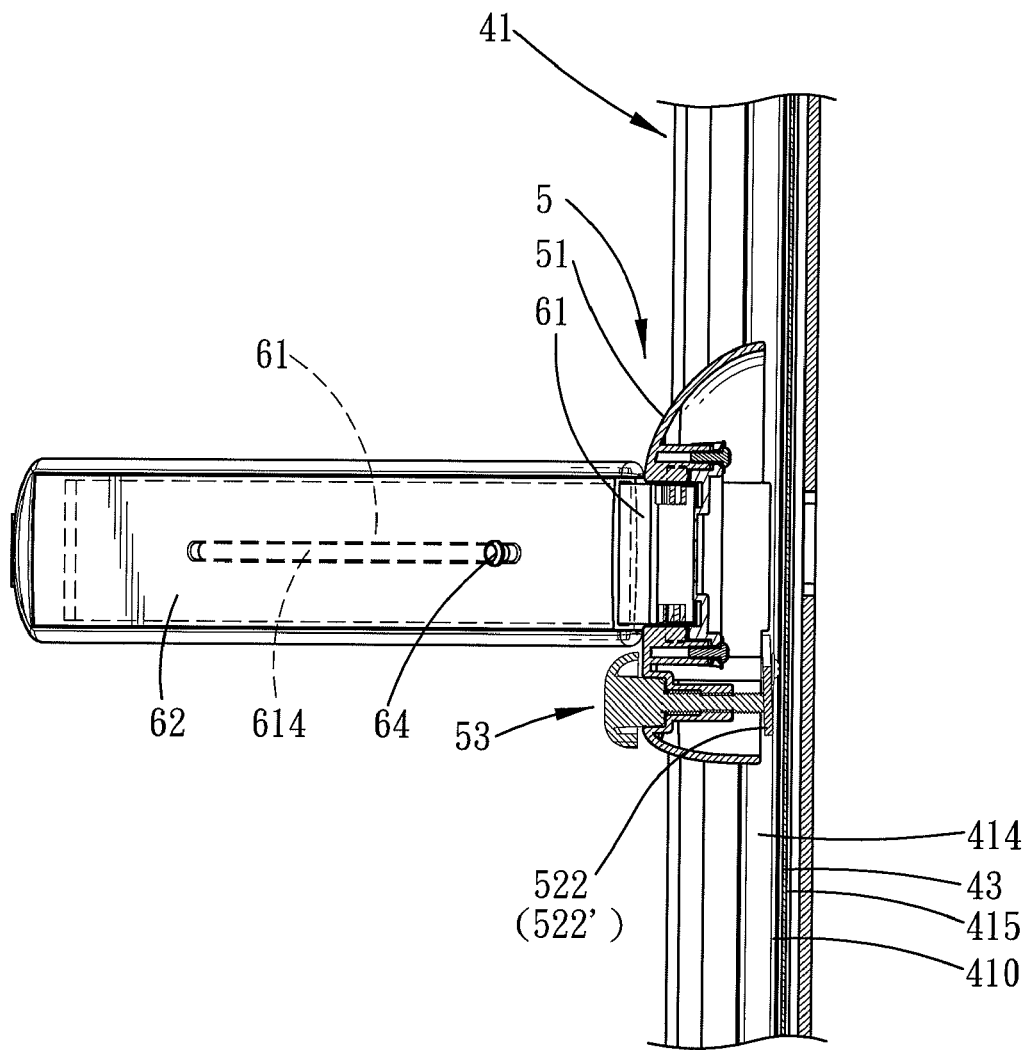

The supporting plate 61 of each of the supporting arms 6 is formed with a slot 614 extending in the transverse direction between the first and second ends thereof. The supporting sleeve 62 is formed with a threaded hole 621 and is provided with a screw 64 extending threadedly through the threaded hole 621 and into the slot 614 for limiting the range of movement of the supporting sleeve 62 on the supporting plate 61, as best shown in FIGS. 9 and 12, which respectively illustrate extended and retracted positions of the supporting sleeve 62 relative to the supporting plate 61.

Figure 4:
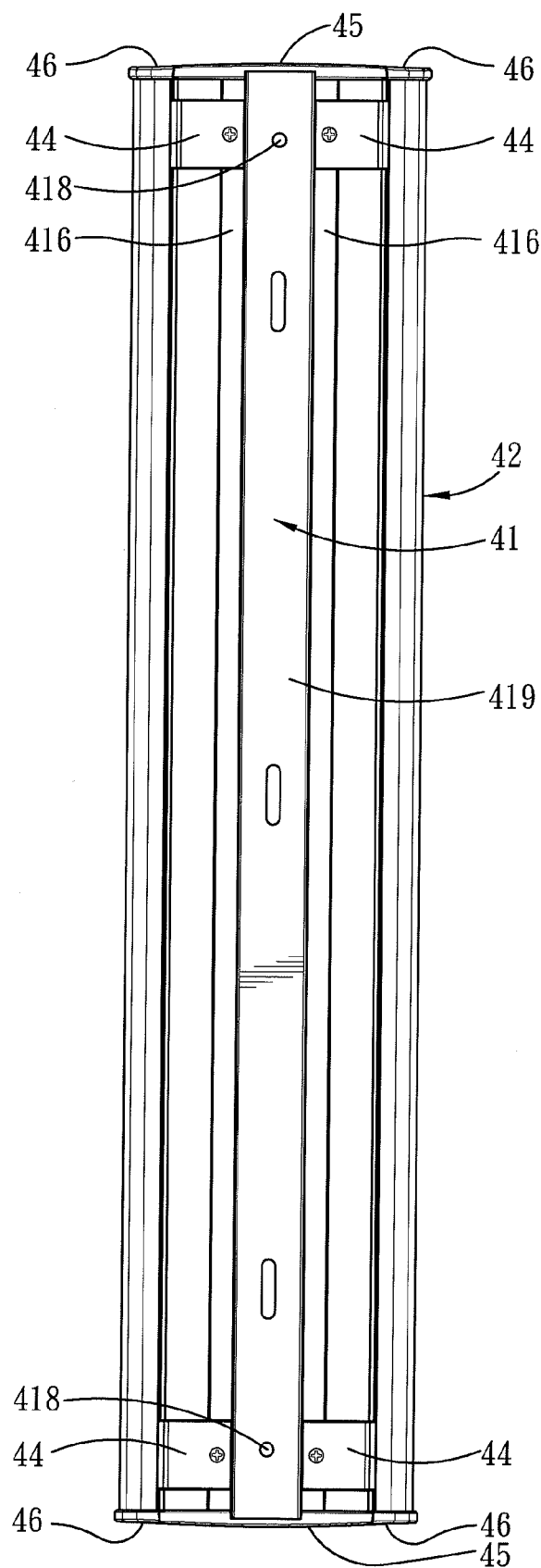
FIG. 4 is a schematic rear view of the preferred embodiment.

Referring back to FIGS. 2 and 3, the wall bracket 4 has a generally U-shaped plate 41, a pair of opposite wing plates 416, and top and bottom end caps 45. The U-shaped plate 41 has top and bottom ends 412, 413, a rear wall 419 (see FIG. 4) formed with a plurality of screw holes 418 for extension of screws 81 therethrough and into the wall 82 (see FIG. 11), and two opposite side walls 417 extending between the top and bottom ends 412, 413 and cooperatively defining the vertical track 40. Each of the side walls 417 has front and rear ends. Each of the wing plates 416 extends sidewisely from the rear end of one of the side walls 417 of the U-shaped plate 41. The top and bottom end caps 45 are mounted respectively on the top and bottom ends 412, 413 of the U-shaped plate 41.

Figure 8:
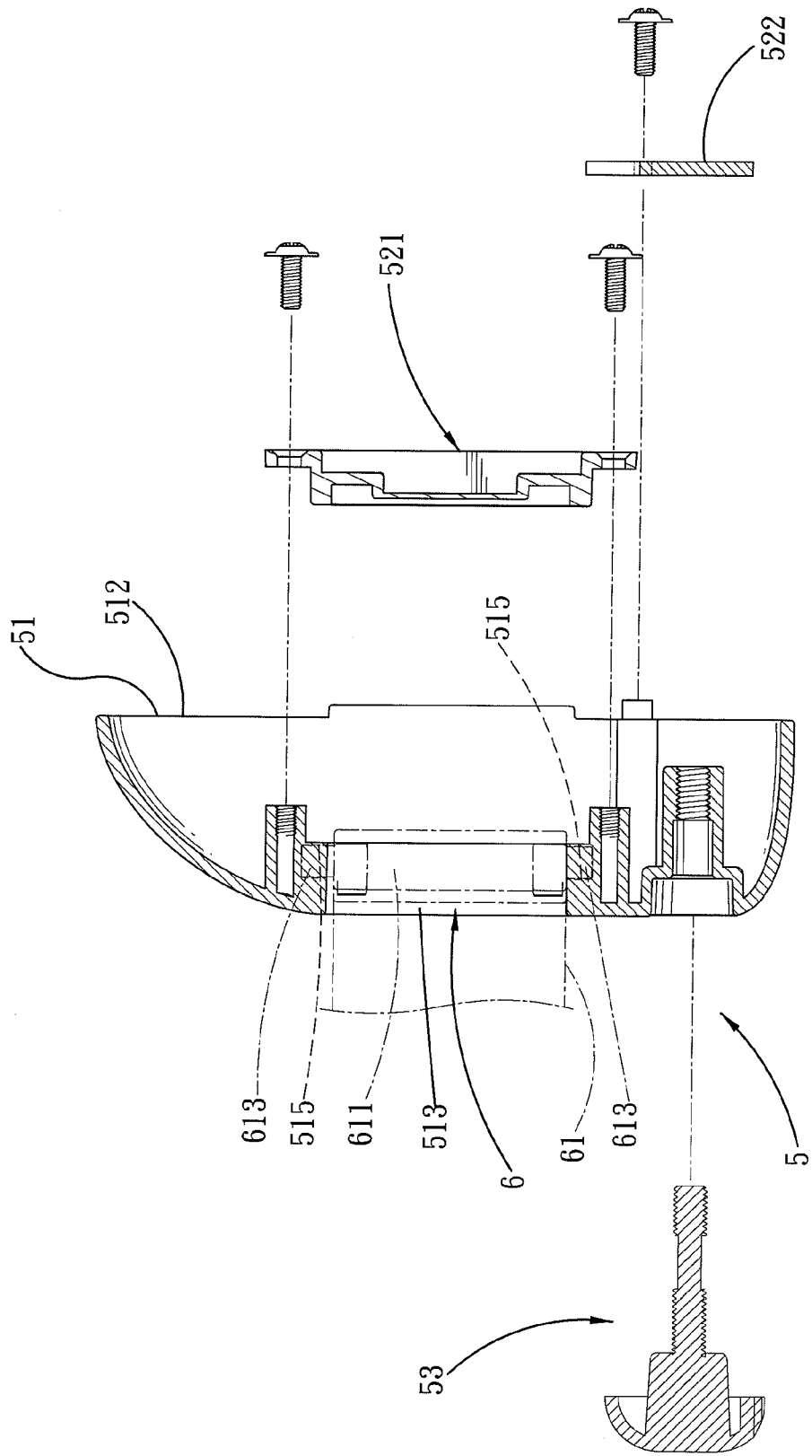
FIG. 8 is an exploded sectional view of the carrier of the preferred embodiment.

The friction-providing member 522 is in the form of a braking plate 522' connected to the carrier 5 and disposed in the vertical track 40 (see FIGS. 8 and 11). The brake mechanism further includes a screw rod 53 threadedly engaging the carrier 5 for driving the braking plate 522' from a vertical position (see FIG. 11) to a tilt position (see FIG. 12), in which the braking plate 522' is tilted relative to the vertical track 40 so as to abut against a pair of rear guiding walls 410 of the vertical track 40 (see FIGS. 3 and 12), which project toward each other from the side walls 417 of the U-shaped plate 41, respectively.

The vertical track 40 of the wall bracket 4 further includes a pair of front guiding walls 411 (see FIG. 3) that project toward each other from the side walls 417 of the U-shaped plate 41, respectively, and that cooperate with the rear guiding walls 410 to define a pair of opposite guiding grooves 414 of the vertical track 40. The rear open end 512 of the carrier housing 51 is formed with a pair of opposite wings 517 (see FIG. 7) extending outwardly therefrom into the guiding grooves 414, respectively (see FIG. 11).

Figure 5:
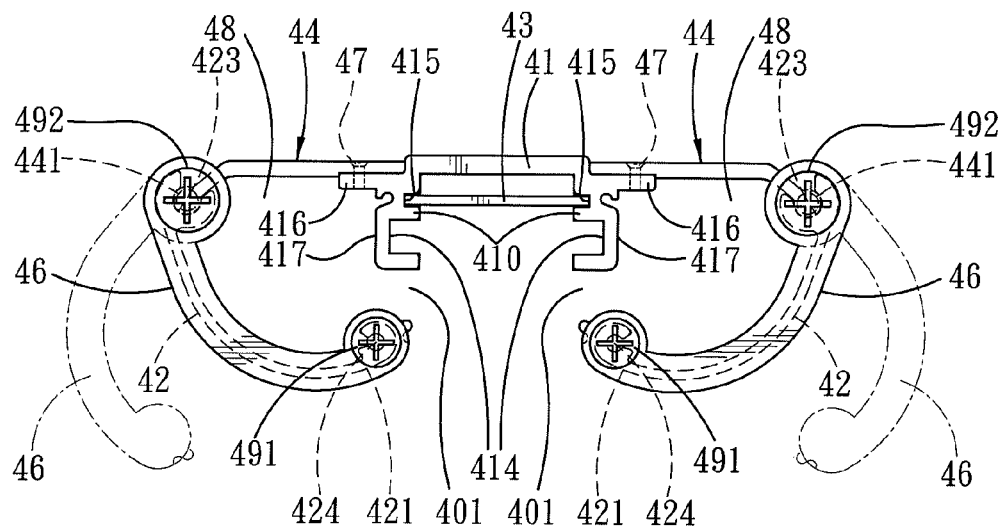
FIG. 5 is a schematic top view to illustrate how the cover plates of the preferred embodiment are movable between opened and closed positions.
Figure 6:
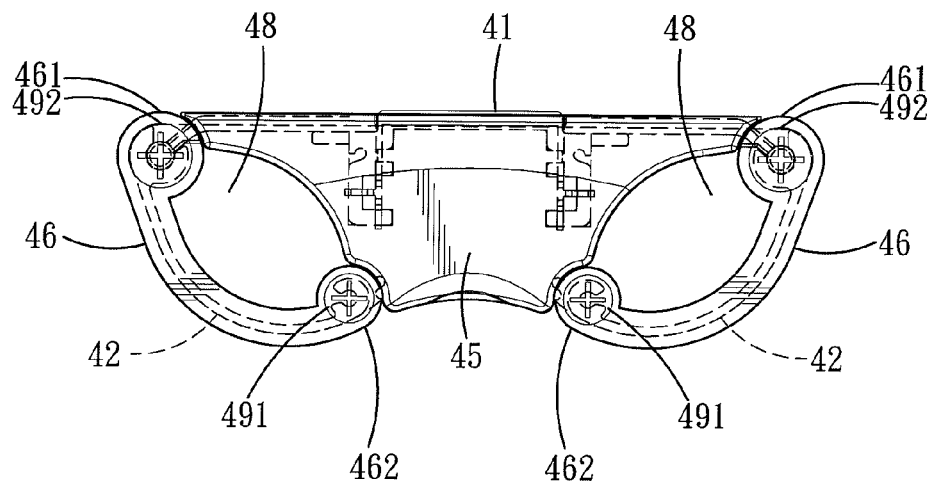
FIG. 6 is a schematic top view to illustrate how a top protective sleeve on one of the cover plates engages a top end cap on the wall bracket of the preferred embodiment.

The wall-mount support further includes: a hinge unit including two pairs of upper and lower leaf plates 44 secured to the wing plates 416 through screws 47 and extending sidewisely from the wing plates 416, respectively, each of the upper and lower leaf plates 44 having a pivot end 441 distal from the respective wing plate 416; and a pair of opposite arcuate cover plates 42, each of which has front and rear ends 421, 422. The rear end 422 of each of the arcuate cover plates 42 is pivoted to the pivot ends 441 of an adjacent pair of the upper and lower leaf plates 44. Each of the arcuate cover plates 42 is rotatable relative to the wall bracket 4 between opened and closed positions (see FIGS. 5 and 6). Each of the cover plates 42 cooperates with the adjacent pair of the upper and lower leaf plates 44, the respective wing plate 416, and said one of the side walls 417 of the U-shaped plate 41 to define an accommodating space 48 thereamong for receiving a cable of the electronic device (not shown). The front end 421 of each of the arcuate cover plates 42 engages releasably the top and bottom end caps 45 when the arcuate cover plate 42 is disposed at the closed position (see FIG. 6), and disengages the top and bottom end caps 45 when the arcuate cover plate 42 is disposed at the opened position (see FIG. 5, indicated by the imaginary lines).

In this embodiment, the front end 421 of each of the arcuate cover plates 42 is spaced apart from the front end of said one of the side walls 417 of the U-shaped plate 41 by a gap 401 (see FIG. 5) adapted for extension of the cable of the electronic device (not shown) therethrough and into the accommodating space 48. The gap 401 between the front end 421 of each of the arcuate cover plates 42 and the front end of said one of the side walls 417 of the U-shaped plate 41 is enlarged when the arcuate cover plate 42 is moved from the closed position to the opened position.

The rear end 422 of each of the arcuate cover plates 42 is formed with a C-shaped groove 423. The pivot end 441 of each of the upper and lower leaf plates 44 is formed with a pivot rod 441' that is fittingly received in the C-shaped groove 423 in the rear end 422 of each of the arcuate cover plates 42.

Each of the arcuate cover plates 42 has top and bottom ends that are provided with top and bottom protective sleeves 46, each of which extends from the rear end 422 of the arcuate cover plate 42 to the front end 421 of the arcuate cover plate 42, and each of which has a front end 462 and a rear end 461. The front end 462 of each of the top and bottom protective sleeves 46 engages releasably a respective one of the top and bottom end caps 45 in a tongue-and-groove engaging manner (see FIG. 6) when the arcuate cover plate 42 is disposed at the closed position, thereby retaining the arcuate cover plate 42 at the closed position. The front end 462 of each of the top and bottom protective sleeves 46 is formed with a screw hole 464 for extension of a first screw 491 therethrough and into a C-shaped groove 424 in the front end 421 of the respective arcuate cover plate 42. The rear end 461 of each of the top and bottom protective sleeves 46 is formed with a screw hole 463 for extension of a second screw 492 therethrough and into the C-shaped groove 423 in the rear end 422 of the respective arcuate cover plate 42.

Each of the top and bottom end caps 45 is formed with two opposite protrusions 453 that are snugly and respectively fitted into the guiding grooves 414 in the vertical track 40.

The U-shaped plate 41 is further formed with a pair of opposite retaining grooves 415 disposed rearwardly of the guiding grooves 414 and frontwardly of the rear wall 419 of the U-shaped plate 41 for receiving an inserting plate 43 into the vertical track 40.

With the inclusion of the carrier 5 and the supporting arms 6 in the wall-mount support of this invention, the aforesaid drawback associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A wall-mount support comprising:
   a wall bracket adapted to be mounted on a wall and having a vertical track;
   a carrier mounted slidably on said vertical track;
   a pair of supporting arms, each of which extends from said carrier in a transverse direction relative to said vertical track and each of which is pivoted to said carrier so as to permit angle adjustment therebetween; and
   a brake mechanism including a friction-providing member connected to said carrier and operable to abut against said vertical track so as to prevent sliding movement of said carrier on said vertical track, wherein each of said supporting arms has a toothed pivot end that is pivoted to said carrier. said toothed pivot ends of said supporting arms meshing with each other.

2. The wall-mount support of claim 1, wherein said carrier includes a carrier housing that has front and rear open ends and two pairs of inner recesses disposed between said front and rear open ends, said toothed pivot end of each of said supporting arms being formed with two opposite studs extending into an adjacent pair of said inner recesses, respectively.

3. The wall-mount support of claim 2, further comprising a confining member secured to and disposed in said carrier housing adjacent to and behind said toothed pivot ends of said supporting arms so as to prevent undesired removal of said toothed pivot ends of said supporting arms from said inner recesses.

4. The wall-mount support of claim 1, wherein each of said supporting arms includes a supporting plate having opposite first and second ends, said first end of said supporting plate being formed with a pivot shaft that defines said toothed pivot end of a respective one of said supporting arms, each of said supporting arms further including a supporting sleeve sleeved on said supporting plate and movable relative to said supporting plate in the transverse direction so as to permit length adjustment for each of said supporting arms.

5. The wall-mount support of claim 4, wherein said supporting plate of each of said supporting arms is formed with a slot extending in the transverse direction between said first and second ends thereof, said supporting sleeve being formed with a threaded hole and being provided with a screw extending threadedly through said threaded hole and into said slot for limiting range of movement of said supporting sleeve on said supporting plate.

6. The wall-mount support of claim 1, wherein said friction-providing member is in the form of a braking plate connected to said carrier and disposed in said vertical track, said brake mechanism further including a screw rod threadedly engaging said carrier for driving said braking plate to tilt relative to said vertical track so as to abut against said vertical track.

7. The wall-mount support of claim 6, wherein said vertical track of said wall bracket defines a pair of opposite guiding grooves, said carrier including a carrier housing having a rear open end that is formed with a pair of opposite wings extending outwardly therefrom into said guiding grooves.

* * * * *